United States Patent Office 2,879,235
Patented Mar. 24, 1959

2,879,235

COMPOSITION COMPRISING CELLULOSE DERIVATIVE, EPOXY RESIN AND EPOXY CURING CATALYST AND PROCESS FOR PREPARING SAME

Fred E. Condo, El Cerrito, Calif., assignor to Shell Development Company, Emeryville, Calif., a corporation of Delaware No Drawing. Application July 21, 1953
Serial No. 369,509

19 Claims. (Cl. 260—13)

This invention relates to the preparation of improved compositions containing cellulose derivatives. More particularly, the invention relates to new compositions containing cellulose derivatives which may be used to prepare shaped articles having excellent solvent and heat resistance, and to the shaped articles prepared therefrom.

Specifically, the invention provides new and improved cellulose derivative compositions which may be used to produce shaped articles having improved resistance to solvents and heat, which comprise compositions containing a solution of a cellulose derivative, such as a cellulose ester or ether, having free hydroxyl groups, a minor quantity of a polyether polyepoxide having an epoxy equivalency of at least 1.1, and particularly the glycidyl polyethers of polyhydric alcohols and polyhydric phenols, and a small quantity of an epoxy curing agent. The invention further provides cured products, such as fibers, films, sheets, and the like, prepared from the above-described compositions by extruding, spreading or otherwise applying the said compositions and heating the resulting products to a temperature above about 50° C.

It is known that solutions of cellulose derivatives, such as acetone solutions of cellulose acetate, may be used to produce shaped articles, such as films, sheets, fibers and filaments. The use of the cellulose derivatives in these applications, however, is limited by the fact that the resulting shaped articles have rather low softening points and poor resistance to solvents. Fabrics prepared from cellulose acetate fibers, for example, have limited utility as they cannot be exposed to high temperatures without softening and cannot be subjected to many dry cleaning processes without being weakened or destroyed.

It is, therefore, an object of the invention to provide improved cellulose derivative compositions. It is a further object to provide new cellulose derivative compositions which may be cured to produce shaped articles having excellent resistance to solvents. It is a further object to provide cellulose ester and cellulose ether compositions which may be cured to produce articles having improved resistance to heat. It is a further object to provide shaped articles prepared from modified cellulose ester and cellulose ester compositions which have excellent heat and solvent resistance and improved strength and dyeability. Other objects and advantages of the invention will be apparent from the following detailed description thereof.

It has now been discovered that these and other objects may be accomplished by novel compositions comprising a solution containing a cellulose ester or cellulose ester having free hydroxyl groups, a minor quantity of a polyether polyepoxide having an epoxy equivalency of at least 1.1, and particularly the glycidyl polyethers of polyhydric alcohols and polyhydric phenols, and a small quantity of an epoxy curing agent and preferably an organic or inorganic acid, certain salts of inorganic acids and boron trifluoride complexes. When these compositions are shaped, such as by spreading or spinning, and the products heated to a temperature above about 50° C., the resulting products have excellent resistance to solvents, such as acetone, and the like, improved resistance to heat, and excellent strength and dyeability.

The polyether polyepoxides to be added to the cellulose ester solutions comprise these compounds possessing at least two ether linkages (i.e., —O— linkages) and a plurality of 1,2-epoxy groups

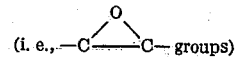

These polyether polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyether polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyether polyepoxide material consists of a single compound and all of the epoxy groups are intact, the epoxy equivalency will be integers, such as 2, 3, 4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5 and the like.

Polyether polyepoxides to be used in the process of the invention may be exemplified by 1,4-bis(2,3-epoxypropoxy)benzene, 1,3-bis(2,3-epoxypropoxy)benzene, 4,4'-bis(2,3-epoxypropoxy)diphenyl ether, 1,3-bis(2,3-epoxypropoxy)octane, 1,4 - bis(2,3-epoxypropoxy)cyclohexane, 4,4' - bis(2 - hydroxy-3,4-epoxybutoxy)diphenyldimethylmethane, 1,3 - bis(4,5 - epoxypentoxy)-5-chlorobenzene, 1,4-bis(3,4-epoxybutoxy)-2-chlorocyclohexane, diglycidyl ether, ethylene glycol diglycidyl ether, resorcinol diglycidyl ether, and 1,2,3,4-tetra(2-hydroxy-3,4-epoxybutoxy)butane.

Other examples include the glycidyl polyethers of polyhydric phenols obtained by reacting a polyhydric phenol with an excess, e.g., 4 to 8 mol excess, of a chlorohydrin, such as epichlorohydrin and dichlorohydrin. Thus, polyether B described hereinafter, which is substantially 2,2 - bis(2,3 - epoxypropoxyphenyl)propane, is obtained by reacting bis - phenol(2,2 - bis(4' - hydroxyphenyl)propane) with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, 1,2,4,5-tetrahydroxycyclohexane, 2-ethylhexanetriol-1,2, 6, glycerol methyl ether, glycerol allyl ether, polyvinyl alcohol and polyallyl alcohol, and mixtures thereof.

Other polyether polyepoxides include the polyepoxy-polyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyether polyepoxides comprises the hydroxy-substituted polyepoxy polyethers obtained by reacting, preferably in an alkaline medium, a slight excess, e.g., .5 to 3 mol excess, of a halogen-containing epoxide, such as epichlorohydrin, with any of the aforedescribed polyhydric phenols, such as resorcinol, catechol, 2,2-bis(4'-hydroxyphenyl)propane, bis[4-(2'-hydroxynaphth-1-yl)-2-2-hydroxynaphth-1-yl]methane and the like.

Other polymeric polyether polyepoxides include the polymers and copolymers of the allylic ether of epoxy-containing alcohols. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl ether-styrene copolymer, methallyl 3,4-epoxybutyl ether-allyl benzoate copolymer, poly(vinyl 2,3-epoxypropyl)ether and an allyl glycidyl ether-vinyl acetate copolymer.

Preferred polyether polyepoxides comprise the members of the group consisting of diglycidyl ether, monomeric aliphatic polyepoxides containing a plurality of glycidyl radicals joined through oxygen ether linkages to aliphatic hydrocarbon radicals, monomeric aromatic polyepoxides containing a plurality of glycidyl radicals joined through oxygen ether linkages to mononuclear or polynuclear aromatic radicals, the polyepoxy-containing reaction product of an aliphatic polyhydric alcohol and epichlorohydrin, the polyepoxy polyesters obtained from polycarboxylic acids and epoxy-containing alcohols, the polyepoxy-containing polymeric reaction product of an aromatic polyhydric phenol and epichlorohydrin, the polyepoxy-containing reaction product of an aliphatic polyhydric alcohol and a polyepoxide compound, the polyepoxy-containing reaction product of a polyhydric phenol and a polyhydric phenol and a polyepoxide compound, the homo- and copolymers of allylic ethers of epoxy-substituted alcohols prepared in the absence of alkaline or acidic catalysts, and copolymers of the aforedescribed epoxy-containing monomers and at least one monomer containing a $CH_2=C=$ group prepared in the absence of alkaline or acidic catalysts.

Coming under special consideration, particularly because of the fine properties of the shaped articles prepared therefrom, are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e.g., 10% stoichiometrical excess of a base, such as sodium aluminate.

The products obtained by the method shown in the preceding paragraph may be described as polyether polyepoxide reaction products which in general contain at least three non-cyclic ether (—O—) linkages, terminal epoxide-containing ether

groups, and halogen attached to a carbon of an intermediate

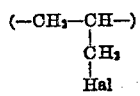

group.

These halogen-containing polyether polyepoxide reaction products obtainable by partial dehydrohalogenation of polyhalohydrin alcohols may be considered to have the following general formula

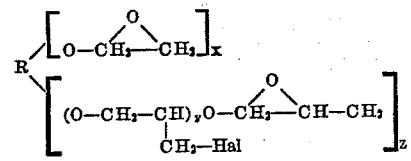

in which R is the residue of the polyhydric alcohol which may contain unreacted hydroxyl groups, X indicates one or more of the epoxy ether groups attached to the alcohol residue, y may be one or may vary in different reaction products of the reaction mixture from zero to more than one, and Z is one or more, and X+Z, in the case of products derived from polyhydric alcohols containing three or more hydroxyl groups, averages around two or more so that the reaction product contains on the average two or more than two terminal epoxide groups per molecule.

The preparation of one of these preferred polyglycidyl ethers of polyhydric alcohols may be illustrated by the following example showing the preparation of a glycidyl polyether of glycerol.

PREPARATION OF GLYCIDYL POLYETHERS OF POLYHYDRIC ALCOHOLS

*Polyether A*

About 276 parts (3 mols) of glycerol was mixed with 832 parts (9 mols) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as polyether A.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Also of importance are the monomeric and polymeric glycidyl polyethers of dihydric phenols, obtained by reacting epichlorohydrin with a dihydric phenol in an alkaline medium. The monomeric products of this type may be represented by the general formula

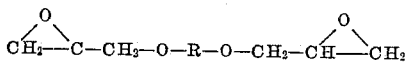

wherein R represents a divalent hydrocarbon radical of the dihydric phenol. The polymeric products will generally not be a single simple molecule but will be a complex mixture of glycidyl polyethers of the general formula

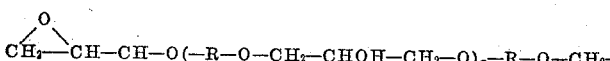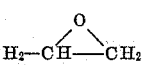

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

Polyether B

About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether B.

Polyether C

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value of 0.40 eq./100 g., and an epoxy equivalency of 1.9. For convenience, this product will be referred to as polyether C.

Polyether D

About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durrans' Mercury Method melting point of the resulting product is 52° C. and the molecular weight is about 710. The product has an epoxy value of 0.27 eq./100 g. and an epoxy equivalency of 1.9. For convenience this product will be referred to herein as polyether D.

Particularly preferred members of the above-described group are the glycidyl polyethers of the dihydric phenols, and especially 2,2-bis(4'-hydroxyphenyl)propane, having an epoxy equivalency between 1.1 and 2.0 and a molecular weight between 300 and 900. Particularly preferred are those having a Durrans' Mercury Method softening point below about 60° C.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

Of particular value in the process of the invention are the polyepoxides containing only carbon, hydrogen, oxygen and halogen atoms.

The cellulose derivatives to be used in the process of the invention are those possessing free hydroxyl groups and preferably at least one hydroxyl group for every four glucose units, and still more preferably one for every two glucose units. Particularly preferred are the cellulose esters having at least one hydroxyl group for every glucose unit. The cellulose derivatives also possess a plurality of other groups, such as ether or ester groups. These cellulose derivatives include those which have been partially esterified with the same acid, or partially etherified with the same alcohol, those that have been esterified with a mixture of acids, or partially etherified with a mixture of alcohols, and those that have been partially esterified with one or more acids and partially etherified with one or more alcohols. Examples of these derivatives include those obtained by partially esterifying cellulose with acetic acid, propionic acid, formic acid, butyric acid, benzoic acid, chloroacetic acid and the like and mixtures thereof such as cellulose acetate, cellulose butyrate, cellulose acetate-butyrate, and cellulose acetate-propionate; those which have been partially etherified with alcohols as methanol, ethanol, butanol, benzyl alcohol and mixtures thereof, such as ethyl cellulose, methyl ethyl cellulose, benzyl cellulose, carboxy methyl cellulose; and the partial ether-ester derivatives obtained by using mixtures of the above acids and alcohols such as the acetate of ethyl cellulose, the propionate of benzyl cellulose and the butyrate of methyl cellulose. Preferred derivatives are the cellulose esters which have from 20% to 70% of the hydroxyl groups esterified with monocarboxylic acids containing from 2 to 12 carbon atoms. The advantages of the process of the invention are particularly in evidence when the cellulose ester is cellulose acetate and preferably a cellulose acetate having an acetic acid content of from 15% to 50%.

The epoxy-curing catalysts used in the preparation of the modified cellulose derivative compositions of the present invention include among others, the acid catalysts as the inorganic acids, and organic acids and anhydrides containing no more than 9 carbon atoms as citric acid, phthalic acid, phthalic acid anhydride, tartaric acid, aconitic acid, oxalic acid, succinic acid, succinic acid anhydride, lactic acid, maleic acid, maleic acid anhydride, fumaric acid, glutaconic acid, 1,2,4-butanetricarboxylic acid, isophthalic acid, terephthalic acid, malonic acid, 1,1,5-pentanetricarboxylic acid, trimellitic acid, phosphoric acid, boric acid, sulfonic acids as benzene sulfonic acid, phosphinic acid as benzenephosphinic acid, perchloric acid, persulfuric acid, and the like; the boron trifluoride complexes such as the p-cresol and urea complex, diethylaniline-boron trifluoride complex; and the salts of inorganic acids, such as zinc fluoborate, potassium persulphate, nickel fluoborate, copper fluoborate, selenium fluoborate, magnesium fluoborate, tin fluoborate, potassium perchlorate, cupric sulfate, cupric phosphate, cupric phosphite, cobaltous fluoborate, cobaltous fluosilicate, chromic sulfate, chromic sulfite, lead arsenite, lead borate, lead molybdate, magnesium arsenate, magnesium sulfate, cadmium arsenate, cadmium silicate, silver chlorate, silver fluosilicate, strontium chlorate, aluminum phosphate, aluminum fluoborate, ferrous sulfate, ferrous silicate, manganese hypophosphite, nickel phosphate and nickel chlorate.

Particularly preferred curing catalysts to be used are the organic polycarboxylic acids and their anhydrides containing not more than 16 carbon atoms, inorganic acids of the formula

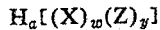
$$H_a[(X)_w(Z)_y]$$

wherein X is a non-metal having an atomic weight above 2, Z is an element which tends to gain from 1 to 2 electrons in its outer orbit, $w$ is an integer, $y$ is an integer greater than 1, and $a$ equals the valence of the radical $[(X)_w(Z)_y]$ and the salts of these acids and metals having an atomic weight between 24 and 210 and being selected from groups I to IV and VIII of the periodic table of elements. Examples of these preferred catalysts include, citric acid, phosphoric acid, phthalic acid, malonic acid, copper fluoborate, zinc fluoborate, iron fluoborate, cadmium fluoborate, nickel fluoborate, cobaltous fluoborate, cobaltous fluosilicate, magnesium fluoborate, strontium fluoborate, copper sulfate, nickel sulfate, copper fluosilicate, calcium phosphate, and magnesium fluosilicate.

In the operation of the process of the invention, one or more of the above-described polyether polyepoxides and one or more of the above-described curing catalysts are added to a solution containing the cellulose derivative and this mixture then heated to an elevated temperature, the said heating being applied during or after the solution has been subjected to the shaping operation, such as being used to form films or coatings or spun into fibers or filaments.

The solvents used to dissolve the cellulose derivatives may be any volatile organic material or mixtures of such materials which have a solvent action on the cellulose derivatives, such as acetone, ethylene glycol, ethylene glycol monoacetate, mixtures of acetone and methyl alcohol, mixtures of acetone and ethyl alcohol, mixtures of acetone and water, mixtures of ethylene dichloride and acetone, mixtures of acetone and methylene dichloride and mixtures of ethanol and methylene dichloride.

The concentration of the cellulose derivative in the solution may vary over a wide range depending upon the intended application and type of ester selected. In most instances, the solutions will have a cellulose derivative strength of from 5% to 40%, and more preferably from about 10% to 30%.

The above-described polyepoxide polyethers are added to these solutions of the cellulose derivatives only in certain minor quantities. In order to obtain the desired properties, such as increase in the heat and solvent resistance, one must utilize at least 10 parts of the polyether polyepoxide per 100 parts of the cellulose derivative. These properties are particularly pronounced when the polyether polyepoxides are employed in amounts varying from 20 parts to 50 parts per 100 parts of the cellulose derivatives and this is the preferred range to be employed.

Solutions formed as indicated above may be employed as lacquers or coating compositions for use with various materials, such as glass, metal, wood and the like and may be used for making films, foils and other sheet-like materials. Such solutions may also be used as adhesives and the like in preparing shatterless glass. Artificial fibers and filaments may be formed by extruding the solutions, and particularly those prepared from the cellulose esters or cellulose acetate, through orifices of a spinnerette, either into a heated atmosphere as in dry spinning, or into a precipitating batch as in wet spinning. If a wet spinning operation is utilized, the epoxy-curing agent may be added to the coagulating batch rather than being introduced into the solution to be extruded. In dry spinning operations, it also may be possible to spray the catalyst on the resulting skeins before or during the heating period. The fibers prepared by these methods may be woven, knitted or otherwise formed into fabrics which are suited for use in preparing soft goods, rugs, carpets, upholsteries, and the like. The solutions may also be used to prepare solid plastic products which may be formed into sheets, blocks or other desired shapes.

As indicated above, the cure of the shaped articles is effected by exposing the products to elevated temperatures for a short period. In most cases, the cure is effected at temperatures ranging from 90° C. to 200° C. in a period varying from about 1 to 2 minutes up to about 20 minutes. In preferred operations, temperatures varying from about 120° C. to 190° C. are generally employed. Lower temperatures may be employed if longer cure periods are permissible but this is not generally desirable for commercial applications. Atmospheric, superatmospheric or subatmospheric pressures may be used as desired, but in most instances, it is preferred to conduct the cure under atmospheric pressures.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the following examples are parts by weight.

The cellulose acetate used in the following examples was a spinning grade cellulose acetate having 1 out of 6 hydroxyl groups unreacted.

*Example I*

This example illustrates the preparation and properties of cellulose acetate-polyether A solutions using boron trifluoride-p-cresol complex as the catalyst.

A solution or dope was prepared by adding 15 parts of cellulose acetate to 85 parts of an acetone-water solution (5 parts water-95 parts acetone). To this solution was added 4.5 parts (30 parts per 100 parts of cellulose acetate) of polyether A (glycidyl ether of glycerol having a molecular weight of about 324) and .225 part of boron-trifluoride p-cresol (5 parts per 100 parts of polyepoxide). Films of this solution were placed onto glass panels using a .008 inch doctor blade. These panels were then heated in an enclosed heating chamber to a temperature of 160° C. for five minutes. The resulting films were clear and hard and had excellent resistance to acetone.

The above solution is also extruded through orifices into an evaporative atmosphere to form filaments of fine denier which are twisted together to form a yarn. The yarn so formed is subjected to a temperature between 70° and 120° C. The resulting yarn has good resistance to solvents and heat and can be knitted or woven into fabrics having a soft hand.

Similar results are obtained by using 2.25 parts of the polyether A and .225 part of the boron trifluoride-p-cresol complex.

*Example II*

This example illustrates the preparation and properties of cellulose acetate-polyether A solutions cured with citric acid.

A solution was prepared by adding 15 parts of cellulose acetate to 85 parts of the above-described acetone-water solution. To this solution was added 4.5 parts of polyether A and 1.8 parts of citric acid. Films of this solution were cast onto glass panels using a .008 inch doctor blade. These panels were then heated in an enclosed heating chamber to a temperature of 160° C. for 5 minutes. The resulting films were clear and hard and had excellent resistance to acetone. The films were still insoluble to acetone after four weeks of exposure.

The above solution is also extruded through orifices as shown in Example I to produce yarn having good resistance to solvents and heat.

*Example III*

This example illustrates the preparation and properties of cellulose acetate-polyether A solutions cured with salts of fluoboric acid.

A dope was prepared by adding 15 parts of cellulose acetate to 85 parts of the above-described acetone-water solution. To this solution was added 4.5 parts of polyether A and .225 part of zinc fluoborate. Films of this solution were placed onto glass panels using a .008 inch doctor blade. These panels were then heated in an enclosed heating chamber to a temperature of 160° C. for five minutes. The resulting films were clear and hard and had excellent resistance to acetone and good resistance to heat.

The above solution is also extruded through orifices as shown in Example I to produce yarn having good resistance to solvents and heat.

Similar results are obtained by using 2.25 parts of the polyether A and .225 part of zinc fluoborate.

Similar results are also obtained by using equivalent amounts of nickel, cadmium and magnesium salts of fluoboric acid.

*Example IV*

This example illustrates the preparation and properties of cellulose acetate-polyether A solutions using diethyl-aniline-fluoboric acid salt as the catalyst.

A solution was prepared as above by adding 15 parts of cellulose acetate to 85 parts of the acetone-water solution. To this solution was added 4.5 parts of polyether A and .225 part of diethylaniline-fluoboric acid salt. A portion of this solution was cast onto glass panels and the panels heated in an enclosed heating chamber to a temperature of 160° C. for 5 minutes. The resulting films were clear and hard and had excellent resistance to acetone and good resistance to heat.

The above solution is also extruded through orifices as shown in Example I to produce yarn having good resistance to solvents.

*Example V*

This example illustrates the preparation and properties of a cellulose acetate-polyether B solution cured with boron-trifluoride-p-cresol complex as the catalyst.

A dope was prepared by adding 15 parts of cellulose acetate to 85 parts of the above-described acetone-water solution. To this solution was added 4.5 parts of polyether B (glycidyl ether of bis-phenol having a molecular weight of about 350) and .225 part of boron trifluoride-p-cresol complex. A portion of this solution was cast onto glass panels and the panels heated in an enclosed heating chamber to a temperature of 160° C. for 5 minutes. The resulting films were clear and hard and had excellence resistance to acetone.

The above solution is also extruded through orifices as shown in Example I to produce yarns having good resistance to solvents.

*Example VI*

This example illustrates the preparation and properties of a cellulose acetate-polyether B solution cured with zinc fluoborate.

A solution of cellulose acetate in an acetone-water mixture was prepared as shown above, and 4.5 parts of polyether B and .225 part of zinc fluoborate were added thereto. This solution was cast onto glass panels and the panels heated in an enclosed heating chamber to a temperature of 160° C. for 5 minutes. The resulting films were clear and hard and had excellent resistance to acetone.

*Example VII*

This example illustrates the preparation and properties of a cellulose acetate-polether C solution cured with boron trifluoride-p-cresol complex.

A cellulose acetate spinning dope was prepared by adding 15 parts of cellulose acetate to 85 parts of the above-described acetone-water solution. To this solution was added 4.5 parts of polyether C (glycidyl ether of bis-phenol having a molecular weight of about 483) and .225 part of boron trifluoride-p-cresol. This solution was cast onto glass panels and the panels heated in an enclosed heating chamber to a temperature of 160° C. for 5 minutes. The resulting films were clear and hard and had good resistance to acetone and other solvents.

*Example VIII*

This example illustrates the preparation and properties of a cellulose acetate-polyether D solution cured with boron trifluoride-p-cresol complex.

A cellulose acetate spinning dope was prepared by adding 15 parts of cellulose acetate to 85 parts of the above-described acetone-water solution. To this solution was added 4.5 parts of polyether D (glycidyl ether of bis-phenol having a molecular weight of about 710 and a Durrans melting point of about 52° C.) and .225 part of boron trifluoride-p-cresol complex. A portion of this solution was cast onto glass panels and the panels heated in an enclosed heating chamber to a temperature of 160° C. for 5 minutes. The resulting films were clear and hard and had good resistance to acetone and other solvents.

The above solution is also extruded through orifices as shown in Example I to produce yarn having good resistance to solvents.

*Example IX*

About 4.5 parts of polyether A and .225 part of zinc fluoborate are added to an acetone solution of ethyl cellulose. A portion of this solution is cast onto glass panels and the panels heated to 160° C. The re-

I claim as my invention:

1. A composition capable of being formed into shaped articles having improved resistance to solvents and heat comprising a solution containing a cellulose derivative of the group consisting of cellulose esters and ethers, said derivatives possessing free hydroxyl groups, from 10 parts to 50 parts per 100 parts of the cellulose derivative of a polyether polyepoxide having a 1,2-epoxy equivalency of at least 1.1, and an epoxy-curing catalyst of the group consisting of polycarboxylic acids containing no more than 9 carbon atoms and their anhydrides, phosphoric acid, boric acid, sulfonic acids, phosphinic acids, perchloric acid, persulfuric acid, boron trifluoride complexes, and salts of metals having an atomic weight between 24 and 210 and the following acids; fluoboric acid, persulfuric acid, perchloric acid, sulfuric acid, phosphoric acid, phosphorous acid, fluosilicic acid, sulfurous acid, boric acid, molybdic acid, arsenous acid, silicic acid, chloric acid and hypophosphorous acid.

2. A composition as defined in claim 1 wherein the polyether polyepoxide in a glycidyl polyether of a polyhydric alcohol having an epoxy equivalency between 1.1 and 3 and a molecular weight between 120 and 800.

3. A composition as defined in claim 1 wherein the polyether polyepoxide is a glycidyl polyether of a polyhydric phenol having an epoxy equivalency between 1.1 and 2.5 and a molecular weight between 300 and 1000.

4. A composition as defined in claim 1 wherein the polyepoxide is a halogen-containing polyether polyepoxide composition which composition is a mixture of ethers of polyhydric alcohols, the polyhydric alcohols having from 2 to 5 hydroxyl groups, with at least two of the hydroxyl groups replaced in part by the group

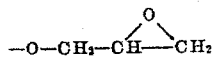

and in part by the group

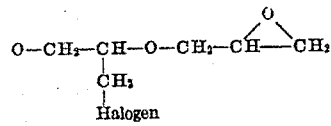

and any hydroxyl groups which are not so replaced being unchanged hydroxyl groups.

5. A composition as in claim 1 wherein the cellulose derivative is cellulose acetate.

6. A composition as in claim 1 wherein the cellulose derivative is ethyl cellulose.

7. A composition as in claim 1 wherein the curing catalyst is a polycarboxylic acid containing no more than 9 carbon atoms.

8. A solvent-resistant product obtained by heating the composition defined in claim 1 to a temperature above 50° C.

9. A composition capable of being formed into shaped articles having improved resistance to solvents and heat comprising a solution of a volatile organic solvent containing a cellulose ester having at least 1 hydroxyl group for every 4 glucose units and a plurality of carboxylic acid ester groups, from 10 parts to 50 parts per 100 parts of cellulose ester of a polyether polyepoxide of the group consisting of glycidyl polyethers of polyhydric alcohols and glycidyl polyethers of polyhydric phenols, said glycidyl polyethers having an epoxy equivalency of at least 1.1 and a molecular weight above 120, and a curing agent of the group consisting of polycarboxylic acids containing no more than 9 carbon atoms and their anhydrides, phosphoric acid, boric acid, sulfonic acids, phosphinic acids, perchloric acid, persulfuric acid, boron trifluoride complexes, and salts of metals having an atomic weight between 24 and 210 and the following acids; fluoboric acid, persulfuric acid, perchloric acid, sulfuric acid, phosphoric acid, phosphorous acid, fluosilicic acid, sulfurous acid, boric acid, molybdic acid, arsenous acid, silicic acid, chloric acid and hypophosphorous acid.

10. A composition as in claim 9 wherein the polyepoxide polyether is a glycidyl polyether of glycerol having a molecular weight between 200 and 350.

11. A composition as in claim 9 wherein the polyepoxide polyether is an epichlorohydrin-2,2-bis(4'-hydroxyphenyl)propane reaction product having a molecular weight between 200 and 800.

12. A composition as in claim 9 wherein the catalyst is boron trifluoride-p-cresol complex.

13. A composition as in claim 9 wherein the catalyst is citric acid.

14. A composition as in claim 9 wherein the catalyst is diethylaniline-boron trifluoride salt.

15. A solvent-resistant product obtained by heating the composition defined in claim 9 to a temperature between 50° C. and 200° C.

16. A composition as in claim 9 wherein the catalyst is zinc fluoborate.

17. A solvent-resistant product obtained by heating the composition defined in claim 16 to a temperature between 50° C. and 200° C.

18. A process for preparing shaped articles having improved solvent and heat resistance which comprises adding from 10 parts to 50 parts per 100 parts of the cellulose derivative of a polyether polyepoxide having a 1,2-epoxy equivalency above 1.1 to a solution of a cellulose ester having at least one hydroxyl group for every two glucose units and a plurality of carboxylic ester groups, and contacting that mixture with an epoxy-curing catalyst of the group consisting of polycarboxylic acids containing no more than 9 carbon atoms and their anhydrides, phosphoric acid, boric acid, sulfonic acids, phosphinic acids, perchloric acid, persulfuric acid, boron trifluoride complexes, and salts of metals having an atomic weight between 24 and 210 and the following acids; fluoboric acid, persulfuric acid, perchloric acid, sulfuric acid, phosphoric acid, phosphorous acid, fluosilicic acid, sulfurous acid, boric acid, molybdic acid, arsenous acid, silicic acid, chloric acid and hypophosphorous acid at a temperature above 50° C.

19. A process for preparing shaped articles having improved solvent and heat resistance which comprises adding from 10 parts to 50 parts per 100 parts of the cellulose derivative of a polyepoxide polyether of the group consisting of glycidyl polyethers of polyhydric alcohols and glycidyl polyethers of polyhydric phenols, said glycidyl polyethers having an epoxy equivalency of at least 1.1 and a molecular weight above about 200, to a solvent solution of a cellulose ester having at least one hydroxyl group for every glucose unit and a plurality of carboxylic ester groups, and from 1 part to 20 parts per 100 parts of the polyether polyepoxide of a curing agent of the group consisting of polycarboxylic acids containing no more than 9 carbon atoms and their anhydrides, phosphoric acid, boric acid, sulfonic acids, phosphinic acids, perchloric acid, persulfuric acid, boron trifluoride complexes, and salts of metals having an atomic weight between 24 and 210 and the following acids: fluoboric acid, persulfuric acid, perchloric acid, sulfuric acid, phosphoric acid, phosphorous acid, fluosilicic acid, sulfurous acid, boric acid, molybdic acid, arsenous acid, silicic acid, chloric acid and hypophosphorous acid, shaping the composition and heating the resulting product to a temperature above 50° C.

(References on following page)

References Cited in the file of this patent

UNITED STATES PATENTS

| | | |
|---|---|---|
| 2,267,842 | Schlack | Dec. 30, 1941 |
| 2,394,910 | Gresham | Feb. 12, 1946 |
| 2,450,234 | Evans | Sept. 28, 1948 |
| 2,633,458 | Shokal | Mar. 31, 1953 |
| 2,643,244 | Simons | June 23, 1953 |
| 2,710,844 | Thompson | June 14, 1955 |
| 2,710,845 | Thompson | June 14, 1955 |

FOREIGN PATENTS

| | | |
|---|---|---|
| 506,999 | Great Britain | June 5, 1939 |